E. MONTI.
APPARATUS FOR CONCENTRATING SOLUTIONS.
APPLICATION FILED NOV. 4, 1905.

940,644.

Patented Nov. 16, 1909.
4 SHEETS—SHEET 1.

Witnesses

Inventor
Endo Monti
By Knight Bros
Attorney

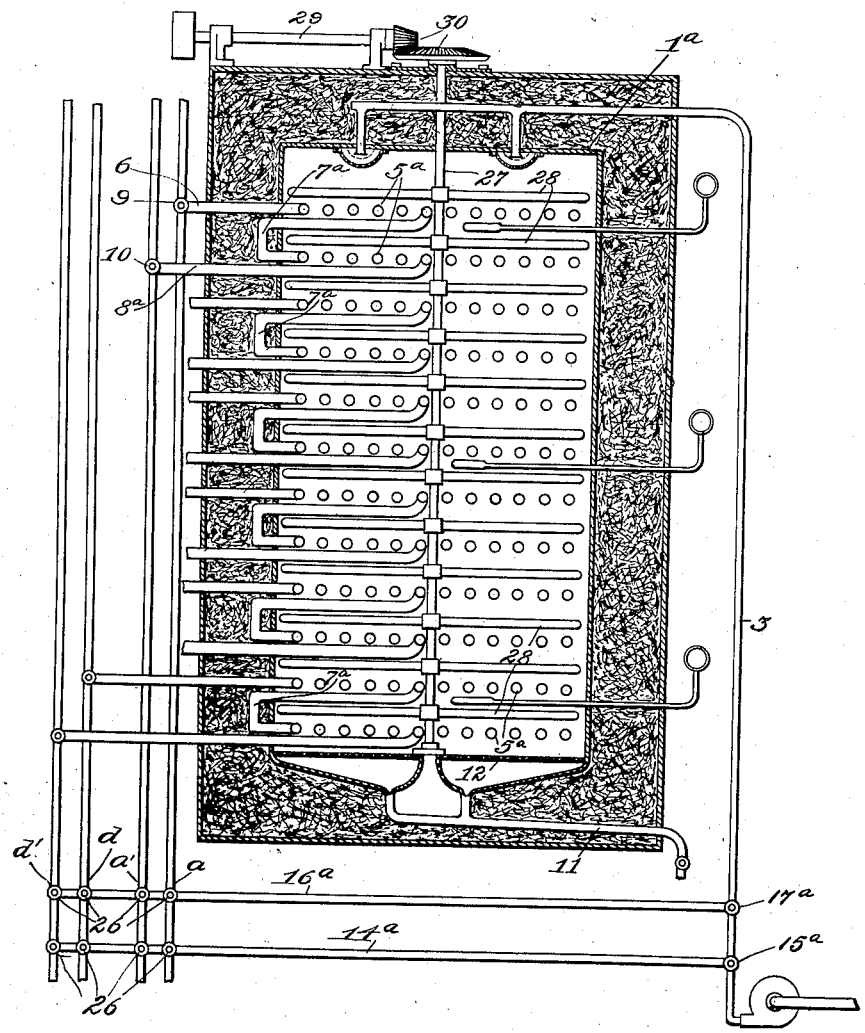

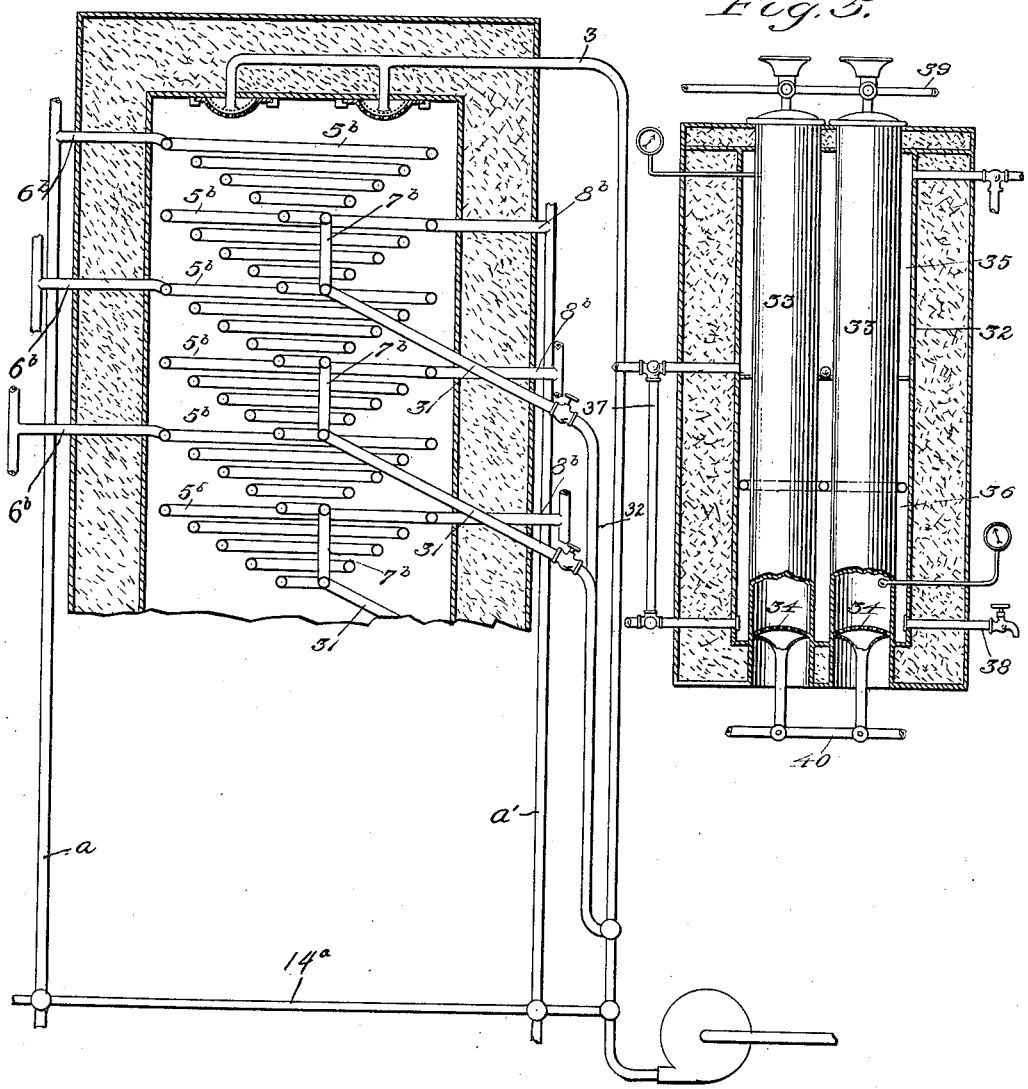

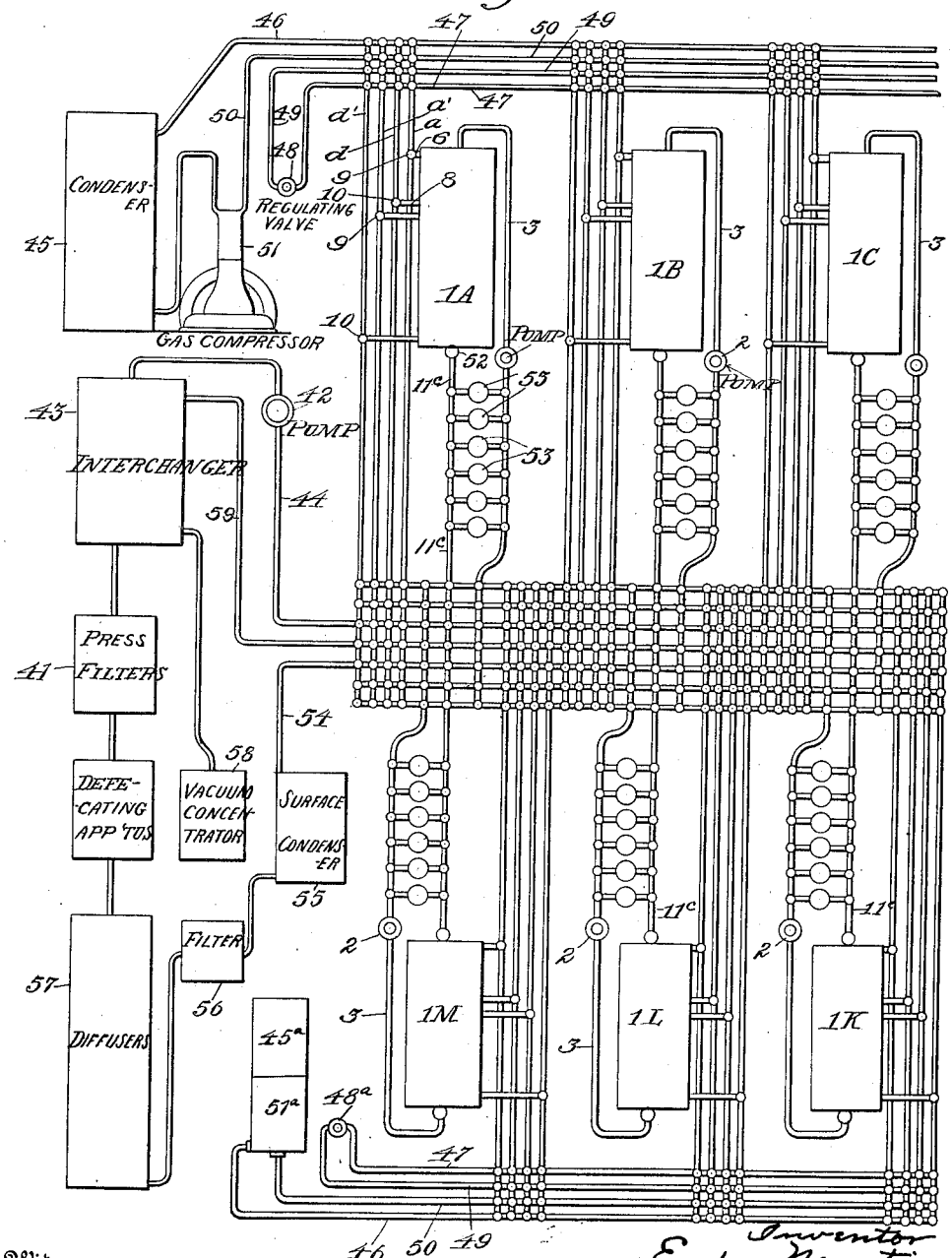

UNITED STATES PATENT OFFICE.

EUDO MONTI, OF TURIN, ITALY.

APPARATUS FOR CONCENTRATING SOLUTIONS.

940,644.

Specification of Letters Patent.

Patented Nov. 16, 1909.

Original application filed September 9, 1904, Serial No. 223,919. Divided and this application filed November 4, 1905. Serial No. 285,936.

*To all whom it may concern:*

Be it known that I, EUDO MONTI, a subject of the King of Italy, and resident of Via Figlie dei Militari N. 20, Turin, Italy, have invented certain new and useful Improvements in Apparatus for Concentrating Solutions, of which the following is a specification.

This invention relates to apparatus for concentrating solutions and more particularly to an apparatus for carrying out the process described in my Patent #761,387, dated May 31, 1904, and my co-pending application filed September 9, 1904, Serial No. 223,920, in both of which the solutions, (any kind of animal, vegetable or fruit extracts, such as beet sugar, meat, coffee, tea, also minerals, salts and the like) are frozen and the soluble matters are displaced from the ice, the present application being a division of an application filed by me September 9, 1904, numbered 223919.

In repeated experiments, I have ascertained that when freezing a solution in a mold or tank in order to concentrate it, much better results are obtained if the freezing is caused to proceed regularly from the top to the bottom of the material. I have also ascertained that the permeability of the frozen portion of the solution to the unfrozen portion thereof, is in an inverse ratio to the percentage of ice crystals present in said solution; and the percentage of ice crystals being the same is in an inverse ratio to the viscosity of the concentrated solution to be displaced from the ice crystals. I have further ascertained that the permeability may be greatly increased and therefore the duration of the displacement shortened by saturating the cooled solution to be frozen with air, dry carbonic acid or other suitable gas which will not alter the solution. I have still further discovered that it is greatly advantageous to stir the solution while the freezing is going on, though agitation may be dispensed with by a skilful use of the other means above referred to.

It is therefore the object of my invention to provide means for concentrating solutions through which advantage may be taken of these discoveries.

Other and further objects will appear in the following description and will be more particularly pointed out in the appended claims.

Figure 1:
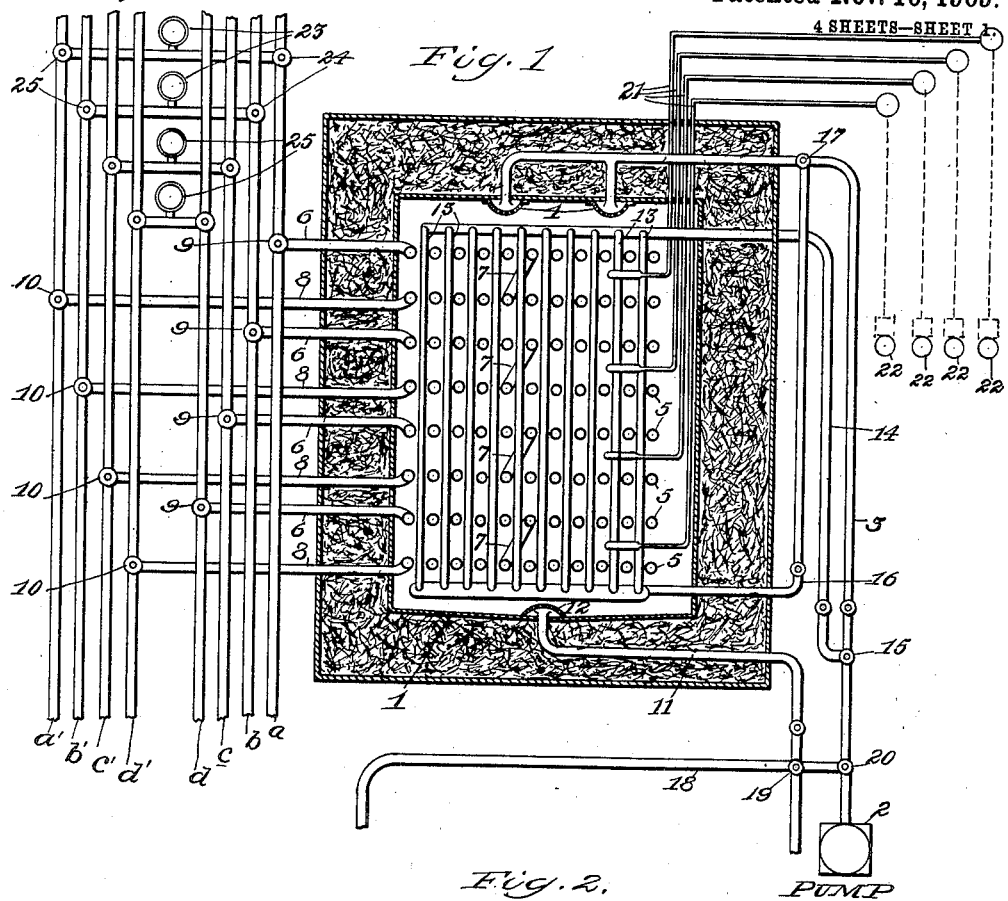
Figure 2:
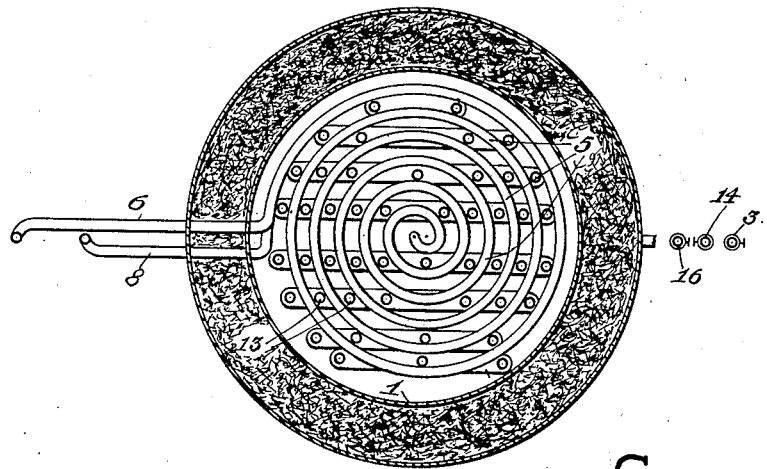

In the drawings: Figure 1 is a vertical section through a freezing tank embodying a portion of my invention. Fig. 2 is a horizontal section through said tank. Fig. 3 is a vertical section through a tank forming another embodiment of my invention. Fig. 4 is a section through a freezing tank forming still another embodiment of my invention and in which the coils are employed for freezing the material within the tank and for cooling the displacing fluid. Fig. 5 is a view of a still further embodiment of my invention. Fig. 6 shows diagrammatically a sugar factory employing my invention.

Referring more particularly to Figs. 1 and 2 of the drawings, 1 indicates the freezing tank which is properly insulated, and 2 the pump for forcing the liquid to be concentrated or the displacing fluid from a suitable source of supply through pipe 3 into the spreaders 4 at the top of the freezing tank, and from here it passes into the said tank. The tank is provided with an outlet pipe 11 having a perforated plate 12 covering its inner end, and leading to the displaced liquid tanks described in my previous patent and application.

Located within the tank are a number of superposed spiral coils 5 arranged in pairs. The upper coil of each pair has an inlet pipe 6 at its outer end or circumference and is connected at its center with the center of the lower coil by a pipe 7, the outer end or circumference of the lower coil being connected to an outlet pipe 8. The inlet pipes of the several pairs are connected to pipes $a$, $b$, $c$, $d$ and the outlet pipes are connected to pipes $a'$, $b'$, $c'$, $d'$, two way valves 9 and 10 respectively serving to control the flow through the inlet and the outlet pipes 6 and 8. Also located within the freezing tank is a series of vertical pipes 13 which are connected together at their upper and at their lower ends, the inlet pipe 14 being connected to a two way valve 15 in the pipe 3 whereby it may be connected with the pump 2; and the outlet pipe 16 being connected to two way valve 17 in pipe 3, whereby it may be connected to the spreaders 4.

A pipe 18 is connected by a three way valve 19 to the outlet pipe 11 and by a two way valve 20 with the pipe 3.

Extending within the tank, one for each pair of spiral coils, is a number of thermometers 21 which are connected with signal bells 22. Manometers 23 may be connected by two way valves 24, 25 with the inlet or the outlets of each pair of coils.

The operation of the invention is as follows: The liquid to be concentrated is forced by pump 2 into the tank or mold 1 through pipe 3 and spreaders 4. After the solution tank has been properly supplied with the material to be concentrated a refrigerant is directed from the pipe $a$ into the upper pair of coils 5 until one of the ingredients (such as water) of the solution in the upper part of the tank is crystallized or frozen. From in and around the crystallized portions in the upper part of the tank, some of the soluble matters drop off or drain by gravity to the uncrystallized solution below. As the solution below the crystallized mass now contains more soluble matters, it is possible to freeze the solution surrounding the next pair of coils at a lower temperature. The most condensed matters also drain off from this layer and the successive layers may then each be frozen at still lower temperatures. The outlet pipe 11 of the tank 1 is opened after the freezing is completed and the most concentrated solutions permitted to drain off. The gradually more and more diluted solutions obtained from a previous operation, as described in my above mentioned patent, are successively forced by pump 2 through pipe 14 into the cooling pipes 13 and cooled to a temperature slightly above the freezing point of the crystallized ingredient. After which the cooled displacing fluids are conducted through pipe 16, valve 17 and pipe 3 to the spreaders 4 from which they pass successively into the tank and displace the gradually less and less concentrated solutions.

The refrigerant employed is preferably a compressed or liquefied gas previously cooled to almost 0° by circulating in the coils in the freezing tank when the frozen mass of a previous operation is contained therein, this liquefied gas being evaporated within the coils to produce the freezing, though of course the same effect may be obtained by causing refrigerator brine to run through the pipes in order to gage the solution and lukewarm brine to be circulated through the same coils in order to melt the separated crystals.

Under ordinary circumstances, the pipes will become coated first thereby retarding the progress of the freezing and the displacement. This objection is overcome by the use of the independently controlled coils, by previously saturating with air, dry carbonic acid or other suitable gas the solution to be frozen, and by stirring the solution while the freezing is going on, preferably by injecting gas therein. This also enables me to extract a higher percentage of water. The gas is conducted from the pipe 18 and through pipes 11 or 3 to the freezing tank. The gas employed for saturating or stirring the liquid should not contain active oxygen and therefore prevent the oxidization of the solution to be concentrated and the alteration of its taste. Liquid or gas under pressure introduced for instance through spreaders 4, may be employed to hasten the displacement of the soluble matters among the ice crystals but it is advisable not to operate the displacement too quickly in order to allow the concentrated solution, interposed between the ice crystals, time to diffuse in the displacing solution.

At the first operation (and all future operations if desired) after the most concentrated matter has been forced out or drained off, lukewarm compressed gas or not refrigerated brine is first directed through the upper coils, thereby causing a melting of the frozen mass in the upper part of the tank. This melted matter then displaces the soluble matter still held within the crystals of the frozen mass below, producing a more dilute solution than the most concentrated solution. The warm refrigerant is then directed through the next coil and so on until the whole frozen mass has disappeared and the resultant has been drained from the tank, thus producing gradually more and more diluted solutions at first and pure water afterward. These gradually more and more dilute solutions may be used to displace the soluble matters held within the frozen mass of another operation, or they may be again frozen and have their remaining soluble matters displaced by the above mentioned process.

By melting the ice within the tank, the concentrated solution is not exposed to impure air and the labor of manually removing the ice from the tank is saved.

The invention has enabled me to displace the interposed concentrate solutions from solutions frozen at temperatures ranging from $-3t$ to $-6t$ ($t$ being the freezing point of the original solution in degrees centigrade below the freezing point of water). Said temperature expressed in absolute degrees would range from $273-3(273-T)$ to $273-6(273-T)$, (T being the absolute temperature at which the original solution starts to freeze, expressed in degree centigrade) according to the viscosity of the concentrated solution, and provided that the freezing point of the saturated solution is not passed.

The interposition of coils in the frozen solution does not interfere with the displacement, provided that they are evenly distributed and that the freezing is carried on slowly and skilfully in order to prevent any part of the solution becoming cooled to a temperature at which the frozen mass would be impermeable.

This apparatus is adapted for concentrating musts, drugs or other vegetable extracts, coffee, tea, meat extracts, and the like, also all kinds of solutions containing mineral compounds or salts.

Lemon juice and the like ought to be concentrated in aluminum, lead or glass coated, cement or masonry tanks, or tanks silvered or coated with a special paint. The coils should also be coated with lead, aluminum or paint or enameled.

With the exception of some strong liquorous wines, such as Madeira, Malaga, port and the like, which have their taste improved if a stream of air is introduced into the freezing liquid, the concentration of wine and fruit juices should always take place in an atmosphere of dry carbonic acid or other inert or reducing gas and the diluted displacing solutions should be stored in a refrigerated room. Beer also being very easily altered should never be allowed to warm or come into contact with the air. Also diluted sugar beet juice should never be allowed to warm over +2 C. or 35 Fahrenheit.

Meat juice should not only be concentrated out of contact with active oxygen but the whole operation should be carried on in a refrigerated room. The meat should be treated with lukewarm water at about 50°, and the solution cooled and filtered, once through a sieve to separate the grease and then through china or the like under strong dry carbonic acid pressure to separate the germs. After this about 9/10 of the water may be separated by freezing according to the above process and the other tenth may be removed by evaporation in vacuum at a temperature not over 50° C. and in an atmosphere of dry carbonic acid or the like. The extract of meat thus prepared has a delicious flavor and contains many very substantial ingredients which are lost or altered by the usual process.

In concentrating alcohol, glycerin, strong brine solutions and other solutions having their freezing points many degrees below the freezing point of water, the displacing solutions should be cooled by an independent refrigerating apparatus.

Referring to Fig. 3 which illustrates another embodiment of my invention $1^a$ indicates the tank having mounted therein the independently controllable coils $5^a$ arranged in pairs as in the first embodiment, the connecting pipes $7^a$ being deflected outwardly and connected to the circumference of the lower coil instead of the center, while the outlet $8^a$ is connected to the center of the lower coil, thereby permitting the use of a stirrer or agitator. This stirrer comprises a vertical shaft 27 and horizontal arms 28 positioned between the coils and is turned by a shaft connected to the shaft 27 by gearing 30. The stirrer acts to agitate the solution during freezing and prevent the uneven freezing of the mass when it is not convenient to prevent it with the more economical means above described. I have shown for the sake of simplicity two pairs of coils connected to the pipes $a$, $a'$, $d$, $d'$. In this embodiment the coils are employed not only for the refrigerant, but for cooling the solution to be frozen and the displacing solutions. For this purpose pipes $14^a$ and $16^a$ connect the pipe 3 with the pipes $a$, $a'$, $d$ and $d'$ whereby through two-way valves $15^a$, and $17^a$ and valves 26, the solutions may be directed from the pump 2 into the coils $5^a$ and back through the pipe 3 to the freezing tank. The operation is otherwise the same as that set forth in the description of the other embodiment.

In Fig. 4, the coils $5^b$ are arranged in pairs and have an inverted conical form with inlets $6^b$ on one side and outlets $8^b$ on the other side of the tank, the coils composing each pair being connected by a pipe $7^b$ at the centers. To the center of the lower coil of each pair is connected a downwardly inclined pipe 31, the several pipes 31 being connected to a common pipe 32 having connection with the pipe 3 (not shown). In this embodiment the displacing solutions are also directed through the freezing coils to cool the said solutions and the form of the coils together with the disposition of the pipes 31 serves to give a complete drainage of the coils.

In the embodiment shown in Fig. 5 the idea of supplying the agitating, the saturating and the displacing gas is illustrated as applied to the construction of apparatus shown in Patent No. 893,006, granted to me on July 14, 1908. In said patent an insulated structure 32 contains a plurality of molds or tanks 33 having removable perforated stoppers or bottoms 34 through which the concentrated matter and gradually more and more dilute solutions are drawn off, after which the ice is taken out by removing the stoppers or bottoms. The refrigerant is supplied to the upper and lower compartments 35 and 36 through piping 37 and is removed through cock 38, the upper compartment being constructed to permit the flow of a warm fluid therethrough and cause the displacement as set forth fully in my above mentioned application. The gas pipe 39 and the gas pipe 40 are respectively connected to the upper and lower ends of the tanks 33 and serve to admit gas to the tanks to cause the saturation of the solution before freezing, the agitation during freezing and the displacement of the soluble matters after freezing, as set forth relative to Fig. 1.

In Fig. 6 I have shown diagrammatically a complete beet sugar factory employing my invention. The defecated sugar juice, obtained by the diffusion process generally in use, drips from the press filters 41 at a temperature of about 60° C. and has an average density of 1.050 corresponding to 10% weight of sugar, that is 11 weights of sugar in one hundred water. Its freezing point should be $0° - 0.059 \times 11 = 0.65°$ C. below zero if the juice were pure. In fact however, the juice contains other substances which lower its freezing point to about $-0.8$ C. or 272.2 absolute degrees. With my improvements I can cool the mass to $3 \times 0.8 = 2.4$ (270.6 absolute degrees) without interfering with the displacement. I first pump by pump 42 the warm juice into the interchangers 43 where it is cooled by a suitable quantity of cooling water and through pipe 44 and $11^c$ to the freezing tank $1^A$ where it is frozen at a temperature not below 270.6 absolute degrees centigrade by evaporating, in the upper coils first and the other coils afterward, liquefied gas coming from the condenser 45 through pipes 46 and 47 regulating valve 48 and pipes 49, $a$ and $d$, returning through pipes $a'$, $d'$, 50 to gas compressor 51. While the freezing is going on in tank $1^A$, I fill tank $1^B$ with a supply of cool juice from the interchangers 43. As soon as tank A has reached the required temperature, I open cock or valve 52 and allow the most concentrated liquor flowing from the frozen mass to descend through pipe $11^c$ to the reconcentrating tank $1^M$. When the concentrated solution has almost ceased to flow from the ice crystals, I cause the liquefied but still warm gas, coming from the condenser to circulate through the upper coils in tank $1^A$, without passing the gas through the pressure regulating valve 48. The luke warm gas melts the ice crystals at the upper end of the tank, and this melted ice strains through the ice crystals filling the lower end of the tank, displaces the concentrated juice interposed amidst said crystals and causes concentrated juice first and gradually more and more diluted sugary solutions afterward, to flow through pipe $11^c$ into tank $1^M$. When the flowing liquid is weaker than the original juice, I cause the more and more diluted solutions dripping from the ice to fill reservoirs 53, and when almost pure water flows, I circulate the warm compressed gas in the lower coils of the freezing tank, thus melting the remaining ice. This ice cold water is led through pipe 54 to the surface condenser 55 of the steam engine or to the jacket of a gas engine to be heated. The water is then filtered in filters 56 and is used in diffusers 57 to displace the sugar from another supply of beets. Meanwhile the solution in tank $1^B$ has been frozen and tank $1^C$ has been filled. Instead of melting the ice in tank $1^B$ I displace as usual the concentrated solution with the more and more diluted solutions obtained in the operation of tank $1^A$ cooling if necessary said solutions in a coil of tank $1^A$ and make use of the depurated ice crystals filling tank $1^B$, to cool the displacing weak solutions to be strained through the ice separated in tank $1^C$, also to cool the second solution to be frozen in tank $1^A$ and the liquefied gas to be evaporated in order to freeze said solution, and so on for an unlimited number of operations. The reconcentration of the concentrated solution filling the tanks $1^M$, $1^L$ and $1^K$ is carried on in the same way as the first concentration, the only difference being that said solution, having a density of about 1.110 and containing 25% sugar, that is 33 weight sugar in 100 water, has its freezing point 2 degrees centigrade below zero (271 absolute degrees) and may be cooled to about 267 absolute degrees ($-6°$ C.). The reconcentrated solution, containing about 50% sugar (100 weight sugar in 100 water), after having been conducted by pipes 44 to the interchanger 43 and heated by the hot juice dripping from the press filters 41, is pumped into a vacuum concentrator 58 where it is worked in the usual way. If the quantity of sugar juice to be concentrated is very large it is advisable to employ an additional compressor $51^a$ with its condenser $45^a$ and regulating valve $48^a$. The sugar juice concentrated by freezing not having been subjected to a high temperature will give a higher percentage of crystallized sugar of a lighter shade than if concentrated in the usual way.

Having thus described my invention what I claim as new is:

1. In an apparatus for concentrating solutions, the combination with a freezing tank, of a plurality of superposed coils arranged in pairs in said tank, and means for supplying a refrigerant to said coils independent of one another.

2. In an apparatus for concentrating solutions, the combination with a freezing tank, of coils arranged therein, means for directing a refrigerant through the coils, means for directing the solution to be concentrated through the coils, and means for drawing off the concentrated matter.

3. In an apparatus for concentrating solutions, the combination with the freezing tank, of coils arranged in pairs therein, means for directing a refrigerant successively through different pairs of the coils, means for drawing off the concentrated matter, and means for directing a warm fluid through the coils to melt the ice formed by passing the refrigerant through the coils, after the concentrated matter has been drawn off.

4. In an apparatus for concentrating solutions, the combination with the freezing tank, of coils arranged therein, means for directing a refrigerant through the coils, and means for directing a displacing fluid through the coils and then into the tank.

5. In an apparatus for concentrating solutions, the combination with the freezing tank, of coils arranged therein in pairs, means for directing a refrigerant successively through each of said pairs of coils, means for directing a gas into the tank, and means for permitting the removal of the concentrated matter.

6. In an apparatus for concentrating solutions, the combination with the freezing tank, of the coils arranged in pairs therein, means for directing a refrigerant through successive pairs of said coils independently, means permitting the removal of the concentrated matter, and means directing the displacing fluid through the coils and into the tank.

7. In an apparatus for concentrating solutions, the combination with the freezing tank, of a plurality of spiral coils arranged therein in pairs, and having a plurality of inlets and outlets, means for directing a refrigerant through any one of said pairs independently of the others, and means permitting the removal of the concentrated matters.

8. In an apparatus for concentrating solutions, the combination with the freezing tank, of a plurality of pairs of spiral coils arranged therein, each pair having separate inlets and outlets, means for directing a refrigerant through each pair of said coils independently of the others, means permitting the removal of the concentrated matters, and a thermometer extending into the tank adjacent to each pair of coils.

9. In an apparatus for concentrating solutions, the combination with a freezing tank, of means for freezing successive zones of the solution in the tank, means at the bottom of the tank for removing the condensed matter, and means for heating successive zones of the tank to melt the frozen mass.

10. In an apparatus for concentrating solutions, the combination with the freezing tank, of a plurality of superposed independent coils arranged in pairs therein, means for supplying a refrigerant to any pair of the coils, and means for supplying a heating fluid to any pair of the coils.

11. In an apparatus for concentrating solutions, a tank, means for conveying a refrigerant to successive zones of said tank for freezing the solution therein, means within the tank for cooling the displacing fluid by means of the frozen mass of the solution, and means for introducing the cooled displacing fluid into the tank to cause a displacement of the soluble matters amidst the crystals therein.

12. In an apparatus for concentrating fluids, the combination with the tank, of spiral superposed coils arranged in pairs, a pipe connecting the center of each pair, an inlet pipe connected to the circumference of the upper coil, and an outlet pipe connected to the circumference of the lower coil, and means for supplying a refrigerant to one or more of said pairs of coils independently of the others.

13. In an apparatus for concentrating solutions, the combination with a freezing tank, of independent means within the tank for freezing the solution throughout different places or layers and separate means for determining the temperature within the different layers.

14. In an apparatus for concentrating solutions, the combination with the freezing tank, of a plurality of pairs of spiral coils arranged within the tank, the members of each pair being connected at their centers, means for supplying a refrigerant to the upper coil of each pair at its circumference and discharging the refrigerant from the lower coil at its circumference, and means for supplying a displacing fluid to be cooled at the circumference of the upper coil and discharging said displacing fluid at the center of the lower coil.

15. In an apparatus for concentrating solutions, a tank, superposed spirals arranged within the tank and adapted to convey a refrigerant into close relation with the solution contained in the tank to freeze it, whereby the soluble matters of the solution are concentrated, means for storing the heated refrigerant, and means for returning such heated refrigerant to the frozen portions whereby the same is melted for the purposes specified.

The foregoing specification signed at Turin, Piedmont, Italy, this 20th day of October, 1905.

EUDO MONTI.

In presence of two witnesses:
GOTTARDO C. PIRONI,
E. GIORDETTI.